United States Patent [19]

Ehrman et al.

[11] Patent Number: 4,888,196
[45] Date of Patent: Dec. 19, 1989

[54] PROCESS FOR TEMPERING FLAVORED CONFECTIONERY COMPOSITIONS CONTAINING REDUCED CALORIE FATS AND RESULTING TEMPERED PRODUCTS

[75] Inventors: Albert M. Ehrman; Paul Seiden; Rose M. Weitzel; Robert L. White, all of Cincinnati, Ohio

[73] Assignee: The Procter & Gamble Company, Cincinnati, Ohio

[21] Appl. No.: 329,619

[22] Filed: Mar. 28, 1989

[51] Int. Cl.$^4$ ............................................. A23G 3/00
[52] U.S. Cl. ........................... 426/601; 426/607; 426/613; 426/660; 426/313; 514/557
[58] Field of Search ............... 426/601, 613, 607, 660, 426/313, 610; 514/557

[56] References Cited

U.S. PATENT DOCUMENTS

| | | | |
|---|---|---|---|
| 2,726,158 | 5/1955 | Cochran et al. | 426/607 |
| 2,783,151 | 3/1957 | Cochran et al. | 426/607 |
| 3,353,964 | 12/1967 | Seiden | 426/607 |
| 3,361,568 | 6/1968 | Kidger | 426/313 |
| 3,396,037 | 7/1968 | Bell et al. | 426/607 |
| 3,450,819 | 1/1969 | Babayan et al. | 514/557 |
| 3,494,944 | 2/1970 | Seiden | 426/607 |
| 3,596,673 | 10/1971 | Seiden | 426/607 |
| 4,268,534 | 9/1981 | Kawada et al. | 426/607 |
| 4,607,052 | 11/1986 | Mendy et al. | 426/607 |
| 4,705,692 | 11/1987 | Tanaka et al. | 426/607 |
| 4,822,875 | 4/1989 | McCoy et al. | 426/607 |
| 4,839,192 | 6/1989 | Sagi et al. | 426/607 |

*Primary Examiner*—Jeanette Hunter
*Attorney, Agent, or Firm*—Richard C. Witte; Ronald L. Hemingway; Eric W. Guttag

[57] ABSTRACT

A process for tempering flavored confectionery compositions, in particular chocolate-flavored confectionery compositions, containing certain reduced calorie fats is disclosed. These compositions are rapidly cooled to a temperature of about 57° F. (13.9° C.) or less and then held in this cooler temperature range for typically at least about 16 hours. The cooled composition is then raised to a temperature in the range from above about 57° to about 72° F. (about 13.9° to about 22.2° C.) in a manner such that bloom formation (surface discoloration) does not occur. The resulting tempered product has a firmness and mouthmelt comparable to cocoa butter-based chocolate products.

49 Claims, No Drawings

PROCESS FOR TEMPERING FLAVORED CONFECTIONERY COMPOSITIONS CONTAINING REDUCED CALORIE FATS AND RESULTING TEMPERED PRODUCTS

TECHNICAL FIELD

This application relates to a process for tempering flavored confectionery compositions, in particular chocolate-flavored confectionery compositions, containing certain reduced calorie fats, as well as the resulting tempered products.

Chocolate derives its desirable eating qualities largely from the melting properties of cocoa butter which is typically present at about 32% by weight. At room temperature (70°-75° F., 21.1°-23.9° C.) cocoa butter is a solid. As a result, chocolate is also firm and solid. Firmness is desirable not only to provide "snap" at initial bite, but also to resist deformation and surface marking of the chocolate from time of manufacture to time of consumption.

Above room temperature, cocoa butter melts progressively until it is fully melted near 93°-94° F. (33.9°-34.4° C.), and is therefore entirely liquid below body temperature (98.6° F., 37° C.). This rapid melting at mouth temperature ("mouthmelt") provides a smooth, creamy consistency during eating and insures rapid release of chocolate flavors to the mouth. The relatively sharp melting behavior just a few degrees below body temperature is unique to cocoa butter among natural fats.

The melting behavior of cocoa butter is the result of its unique triglyceride composition. However, this unique triglyceride composition, like the triglyceride composition of other natural fats, is relatively high in calories. This means that persons who must restrict their intake of calories must either reduce the amount of chocolate products they consume, or in the extreme case, completely exclude such products from their diet. Accordingly, it would be desirable to be able to replace all or a portion of the cocoa butter present in such chocolate products with a substitute fat having fewer calories.

The selection of a reduced calorie substitute fat for cocoa butter is not straightforward. Cocoa butter has complex polymorphic properties, i.e. can exist in many different crystalline forms, including $\alpha$, $\beta'$ and $\beta$-3. To provide the expected properties of mouth melt and firmness, the cocoa butter in chocolate products must be properly tempered to form L a stable $\beta$-3 phase having a high population of small fat crystals. Standard tempering conditions for cocoa butter-based chocolate typically involve cooling a molten mass of the chocolate to form sufficient $\beta$-3 crystals, reheating this mass to melt fat crystals other than the $\beta$-3 crystals and then cooling the mass again to transform the remainder of the cocoa butter into the $\beta$-3 phase.

The chocolate flavoring in such products is typically provided by cocoa powder or chocolate liquor which also contain cocoa butter. Therefore, the reduced calorie substitute fat needs to form a stable fat crystal phase in presence of the cocoa butter included as part of the chocolate flavoring, as well as any milkfat that is present. Otherwise, the chocolate product formed during molding or enrobing will not have the proper firmness or mouthmelt and will likely form bloom, i.e., an undesirable whitish or grayish discoloration visible on the surface of the chocolate product but sometimes present in the interior.

Even if the reduced calorie substitute fat can set up in a stable $\beta$-3 phase, the proper tempering conditions for chocolate-flavored products containing such substitute fats and cocoa butter must also be selected. The selection of appropriate tempering conditions is not necessarily predictable. During tempering, the reduced calorie substitute fat and cocoa butter can potentially transform into a stable $\beta$-3 phase at different rates. For example, the reduced calorie substitute fat could transform into the $\beta$-3 phase at a much slower rate than that of cocoa butter. If such were the case, chocolate-flavored products containing the reduced calorie substitute fat could not be tempered according to standard cocoa butter tempering conditions without potentially forming undesired bloom or having problems in terms of firmness and mouthmelt of the product.

BACKGROUND ART

A. Polymorphic Properties of Short Chain and Medium Chain Fatty Acid Triglycerides of 1-Monostearin and 1-Monobehenin Menz, "Polymorphism of Diacid Triglycerides of the Stearic Acid and Behenic Acid Series," *Fette Seifen Anstrichmittel*, Vol. 77, No. 5 (1975), pp. 170-73, discloses a study of the polymorphic properties of 1-monostearin and 1-monobehenin which have been esterified with $C_2$, $C_4$, $C_6$ or $C_8$ short/medium chain saturated fatty acids. Table 5 shows the transition rates of the sub $\alpha$ form of the various 1-monobehenin triglycerides to the respective $\beta$ crystalline form at a storage temperature of from 10° to 15° C. (50° to 59° F.). The sub $\alpha$ form of the pure $C_2$, $C_4$ and $C_6$ derivatives of 1-monobehenin was found to be very stable and only slowly transformed (several months or more) to the $\beta$ form. The sub $\alpha$ form of the pure $C_8$ derivative of 1-monobehenin was found to have low stability and rapidly transformed (approximately 2 hours) to the $\beta$ form.

B. The Sub $\alpha$ Phase of Cocoa Butter and Cold Temperature Processing of Cocoa Butter/Chocolate Wille et al, "Polymorphism of Cocoa Butter," *J. Am. Oil Chem. Soc.*, Vol. 43 (1966), pp. 491-96, discloses a study of the polymorphic forms of cocoa butter. Six crystalline States I-VI were identified. In the abstract of this article, State I is identified as a definite but fleeting and not readily characterized sub $\alpha$ state. The behavior of this sub $\alpha$ state is discussed in detail at page 495.

Chapman et al, "Cocoa Butter and Confectionery Fats: Studies Using Program Temperature X-Ray Diffraction and Differential Scanning Calorimetry," *J. Am. Oil Chem. Soc.*, Vol. 48 (1971), pp. 824-30, discusses the six different polymorphic phases of cocoa butter. See pages 827-28. At page 828, this article says "It is not just the higher melting forms that are of interest, since there are some processes concerned with manufacturing chocolate pieces that involve temperatures as low as −10° C."

Vaeck, "Cacao Butter and Fat Bloom," *Twenty Years of Confectionery and Chocolate Progress*, Chapter 15, (1970), pp. 123-55, discusses the problem of fat bloom in chocolate and chocolate-coated confections. Page 133 describes the various polymorphic forms of cocoa butter, including the sub $\alpha$ form characterized as "gamma." At page 148, this article says "Theoretically, it appears even possible to temper without mixing by cooling the chocolate below 0° C. (32° F.) and keeping it at that temperature for a suitable time. This is not practical for it probably would require several weeks."

Brosio et al, "A Pulsed Low Resolution NMR Study of Crystallization and Melting Processes of Cocoa Butter," *J. Am. Oil Chem. Soc.*, Vol. 80 (1980), pp. 78–82, involves a study of the melting curves of different cocoa butter samples by the use of pulsed low resolution NMR. Pages 80–81 discuss the melting curves of cocoa butter samples tempered at −18° C.

DISCLOSURE OF THE INVENTION

The present invention relates to a process for tempering flavored confectionery compositions which comprise:

a. a flavor enhancing amount of a flavor component;
b. from about 25 to about 45% of a fat component comprising:
  (1) at least about 70% of a reduced calorie fat having:
    (a) at least about 85% combined MLM and MML triglycerides;
    (b) no more than about 5% combined LLM and LML triglycerides;
    (c) no more than about 2% LLL triglycerides;
    (d) no more than about 4% MMM triglycerides;
    (e) no more than about 7% other triglycerides;
  wherein M is a $C_6$ to $C_{10}$ saturated fatty acid residue and L is a $C_{20}$ to $C_{24}$ saturated acid residue;
    (f) a fatty acid composition having:
      (i) from about 40 to about 60% combined $C_8$ and $C_{10}$ saturated fatty acids,
      (ii) a ratio of $C_8$ to $C_{10}$ saturated fatty acids of from about 1:2.5 to about 2.5:1,
      (iii) from about 40 to about 60% behenic fatty acid,
  (2) up to about 15% milkfat;
  (3) up to about 20% cocoa butter;
  (4) no more than about 4% diglycerides; and
c. from about 55 to about 75% other nonfat confectionery ingredients.

The tempering process of the present invention comprises the following steps:

(I) forming a temperable flavored confectionery composition as defined above;
(II) rapidly cooling the composition of step (I) to a temperature of about 57° F. (13.9° C.) or less so that the reduced calorie fat forms a sub α phase;
(III) holding the cooled composition of step (II) at a temperature of about 57° F. (13.9° C.) or less for a period of time sufficient to form an effective amount of β-3 crystals from a portion of the sub α phase of the reduced calorie fat; and
(IV) after step (III), warming the cooled composition to a temperature in the range of from above about 57° to about 72° F. (about 13.9° to about 22.2° C.) in a manner such that: (a) the remaining portion of the reduced calorie fat transforms into a stable β-3 phase; and (b) the β-3 phase formed does not melt.

The reduced calorie fat defined above provides significantly fewer calories in flavored confectionery products, especially chocolate-flavored products. In addition, this reduced calorie fat, like cocoa butter, can be crystallized into a stable β-3 phase. However, it has been found that the rate of crystallization of this reduced calorie fat into the β-3 phase is extremely slow under standard tempering conditions used with cocoa butter-based chocolate products. This rate is sufficiently slow so as to make cocoa butter-type tempering of flavored confectionery compositions containing this reduced calorie fat commercially unattractive.

Surprisingly, it has been found that tempering according to the present invention provides a commercially attractive process that is simpler than even the standard tempering conditions used with cocoa butter-based chocolate products. In particular, the tempering process of the present invention can be carried out during the normal warehousing and distribution of the flavored confectionery product. The present invention achieves these desirable results by taking advantage of the ability of the reduced calorie fat to transform into the desired stable β-3 phase, via the less stable sub α phase. This transformation of the reduced calorie fat from the sub α phase to the stable β-3 phase according to the tempering process of the present invention occurs without undesired bloom formation. The resulting tempered products also have a firmness and mouthmelt comparable to cocoa butter-based chocolate products.

A. Definitions

The "sub α", "β-3" and "α" phases referred to herein are crystalline fat phases well known to those skilled in the art fat X-ray crystallography. See Wille et al "Polymorphism of Cocoa Butter," *J. Am. Oil Chem. Soc.*, Vol. 43 (1966), pp. 491–96, which describes the six crystalline fat phases of cocoa butter.

As used herein, the term "stable β-3 phase" refers to a β-3 crystalline phase having a high population of small fat crystals which is resistant to bloom formation.

As used herein, the term "comprising" means various components or steps can be conjointly employed in the present invention. Accordingly, the term "comprising" encompasses the more restrictive terms "consisting essentially of" and "consisting of."

All percentages, ratios and proportions used herein are by weight unless otherwise specified.

B. Flavored Confectionery Compositions

1. Flavor Component

The flavored confectionery compositions useful in the tempering process of the present invention comprise a flavor-enhancing amount of a flavor component. The flavor component comprises flavor constituents which impart positive flavor characteristics, and optionally nonflavor constituents normally present in flavor compositions, e.g. flavor carriers. As used herein, the term "flavor-enhancing amount" refers to an amount of the flavor component sufficient to impart positive flavor characteristics to the composition. As such, the amount of the flavor component sufficient to be "flavor enhancing" can depend on the flavor source used, the flavor effects desired and like factors. Typically, the flavor component (nonfat constituents) comprises from about 0.1 to about 25% of the composition.

A variety of flavor sources can be used to form the flavor component. A particularly preferred flavor source is a chocolate flavor. Suitable chocolate flavors can be derived from chocolate-liquor, cocoa powder, or blends thereof. These chocolate materials (fat plus nonfat ingredients) are typically included at from about 5 to about 25% of the composition. As used herein, "chocolate-liquor" refers to the solid or semi-plastic food prepared by finely grinding cacao nibs. Chocolate-liquor usually contains from about 50 to about 58% cocoa butter fat. As used herein, "cocoa powder" refers to the residual material remaining after part of the cocoa butter fat has been removed from ground cacao nibs. Cocoa powder usually contains from about 10 to about 22% cocoa butter fat. Other sources of flavor include vanillin, ethyl vanillin, spices, coffee, brown sugar, etc., as well as mixtures of these flavors.

2. Fat Component

The flavored confectionery composition further comprises a fat component. As used herein, the term "fat component" refers to all triglycerides, diglycerides and monoglycerides present in the composition. For example, if chocolate-liquor is used to formulate chocolate-flavored compositions, the cocoa butter portion is included as part of the fat component. If milk solids are used, for example, in milk chocolate-flavored compositions, any milkfat present is included as part of the fat component.

The fat component comprises from about 25 to about 45% of the composition. The particular amount of the fat component which is suitable depends on the particular application in which the flavored confectionery composition is used. For molding applications (e.g., chocolate-flavored bars), the fat component preferably comprises from about 28 to about 35% of the composition. For enrobing applications (e.g., enrobed candy bars or cookies), the fat component preferably comprises from about 30 to about 45% of the composition. For depositing applications (e.g. chocolate-flavored chips), the fat component preferably comprises from about 25 to about 35% of the composition.

a. Reduced Calorie Fat

The major constituent in this fat component is a reduced calorie fat. By "reduced calorie fat" as used herein is meant fats that provide an at least about 10%, and preferably an at least about 30%, reduction in calories relative to corn oil. These reduced calorie fats usually provide between about 20% and about 50% reduction in calories. The reduction in calories provided by these reduced calorie fats is based on the net energy gain (in Kcal) of rats that have ingested a diet containing the reduced calorie fat, relative to the net energy gain (in Kcal) of rats that have ingested an identical diet, but containing corn oil instead of the reduced calorie fat. The test diets used are nutritionally adequate to support both maintenance and growth of the rats. Total food intake and fat/oil intake are also matched between the two diet groups so that differences in net carcass energy gain are due entirely to the utilizable energy content of the fat/oil. ("Net energy gain" is based on the total carcass energy (in Kcal) of the rats fed the test diet for some period of time (usually 4 weeks), reduced by the mean starting carcass energy (in Kcal) determined from a study of a different group of rats of the same sex, strain, and similar body weight fed a test diet that does not contain the fat/oil. "Total carcass energy" is determined by the dry carcass energy program (Kcal per gram) multiplied by the dry weight of the carcass (in grams). "Carcass energy per gram" is based on the carcass energy (in Kcal) as determined by bomb calorimetry of a homogeneous sample of the total dry carcass. All of these energy values are the average of a representative sample of rats (i.e., 10 rats).)

The particular amount of reduced calorie fat present in the fat component depends upon the degree of calorie reduction desired and the particular mouthmelt, firmness and tempering properties desired for the flavored confectionery composition. These reduced calorie fats comprise at least about 70% of the fat component. Preferably, these reduced calorie fats comprise at least about 75% of the fat component, more preferably at least about 80%, and most preferably at least about 85% of the fat component.

Reduced calorie fats useful in the fat component are characterized by particular levels of triglycerides selected from MLM, MML, LLM, LML, MMM and LLL triglycerides, wherein M is a medium chain $C_6$ to $C_{10}$ saturated fatty acid residue and L is a long chain $C_{20}$ to $C_{24}$ saturated fatty acid residue. See U.S. application entitled "Reduced Calorie Fats Made from Triglycerides Containing Medium and Long Chain Fatty Acids," to Paul Seiden, Ser. No. 329,620 (P&G Case 3760R), filed Mar. 28, 1989 (herein incorporated by reference), which discloses reduced calorie fats useful in the fat component, and especially Examples 1 and 2 for methods for making same.

"MML" represents a triglyceride containing a long chain saturated acid residue in the #1 or #3 position (an end position) with two medium chain saturated fatty acid residues in the remaining two positions, while "MLM" represents a triglyceride with a long chain fatty acid residue in the #2 position (the middle position) and two medium chain fatty acid residues in the #1 and #3 positions. (These MLM and MML triglycerides have carbon numbers predominantly in the range of from $C_{38}$ to $C_{42}$). Similarly, "LLM" represents a triglyceride with a medium chain fatty acid residue in the #1 or #3 position and two long chain fatty acid residues in the remaining two positions, while "LML" represents a triglyceride with a medium chain fatty acid residue in the #2 position and two long chain fatty acid residues in the #1 and #3 positions. (These LLM and LML triglycerides have carbon numbers predominantly in the range of $C_{52}$ to $C_{54}$.)

"MMM" represents a triglyceride containing medium chain saturated fatty acid residues a all three positions. (These MMM triglycerides have carbon numbers predominantly in the range of $C_{24}$ to $C_{30}$.) Similarly, "LLL" represents a triglyceride containing long chain saturated fatty acid residues at all three positions. (These LLL triglycerides have predominantly a carbon number of $C_{66}$.) Any triglycerides other than MLM, MML, LLM, LML, MMM and LLL triglycerides are referred to herein as "other triglycerides."

To provide desirable mouthmelt characteristics in the resulting tempered confectionery products, the level of mono-long chain (MLM and MML) triglycerides is preferably maximized in these reduced calorie fats. Conversely, to avoid undesirable waxiness, the level of di-long chain (LLM and LML) triglycerides, as well as the level of tri-long chain (LLL) triglycerides, in these reduced calorie fats is preferably minimized. In addition, to avoid undesirable softness in the resulting tempered confectionery products, the level of tri-medium chain (MMM) triglycerides in these reduced calorie fats is preferably minimized. Within these guidelines, reduced calorie fats useful in the fat component can comprise: (1) at least about 85%, preferably at least about 90% and most preferably at least about 94% combined MLM and MML triglycerides; (2) no more than about 5%, preferably no more than about 2%, and most preferably no more than about 1% combined LLM and LML triglycerides; (3) no more than about 2%, preferably no more than about 1%, and most preferably no more than about 0.5% LLL triglycerides; and (4) no more than about 4%, preferably no more than about 2%, and most preferably no more than about 1% MMM triglycerides; (5) no more than about 7%, preferably no more than about 5%, and most preferably no more than about 3.5% other triglycerides.

The reduced calorie fats useful in the fat component are further characterized by a particular fatty acid composition. One important aspect of this fatty acid composition is the total amount of medium chain $C_8$ and $C_{10}$ saturated fatty acids (i.e., caprylic and capric acids). These medium chain fatty acids generally control the melting point of the respective triglyceride mixture. In addition, these medium chain fatty acids are readily hydrolyzed (especially if attached at the #1 or #3 positions) by pancreatic lipase and then absorbed to provide a rapid energy source. However, these medium chain fatty acids, when metabolized, provide less total calories than longer chain fatty acids.

The fatty acid composition of these reduced calorie fats can comprise from about 40 to about 60%, and preferably from about 45 to about 55% combined $C_8$ and $C_{10}$ saturated fatty acids. However, due to the sources of $C_8/C_{10}$ saturated fatty acids typically used to synthesize these reduced calorie fats, a minor amount of $C_6$ saturated fatty acid (i.e., caproic acid) can be present. Preferably, these reduced calorie fats contain no more than about 10%, and most preferably no more than about 5% $C_6$ saturated fatty acid.

In addition to the combined percentage of these medium chain saturated fatty acids, the particular ratio of $C_8$ to $C_{10}$ saturated fatty acids is important in controlling the melting point, as well as the tempering properties, of these reduced calorie fats. For example, higher amounts of $C_8$ saturated fatty acid lower the melting point of the reduced calorie fat and thus make the resulting tempered confectionery product softer. Conversely, higher amounts of $C_{10}$ saturated fatty acid raise the melting point of the reduced calorie fat and impart a greater degree of firmness to the resulting tempered confectionery product. Within these guidelines, reduced calorie fats useful in the fat component can have a ratio of $C_8$ to $C_{10}$ saturated fatty acids of from about 1:2.5 to about 2.5:1, preferably from about 2:1 to about 1:2, and most preferably from about 1.5:1 to about 1:1.5.

The other important aspect of the fatty acid composition of these reduced calorie fats is the amount of $C_{22}$ saturated fatty acid (i.e., behenic acid). Behenic fatty acid, when hydrolyzed from the respective triglyceride, is solid at body temperature, i.e. 98.6° F. (37° C.). According, the hydrolyzed behenic fatty acid is much more poorly absorbed compared to the medium chain saturated fatty acids and other long chain saturated and unsaturated fatty acids.

The reduced calorie fats of the present invention can comprise from about 40 to about 60%, and preferably from about 40 to about 50% behenic fatty acid. Due to the sources of behenic fatty acid typically used to synthesize these reduced calorie fats, minor amounts of long chain $C_{20}$ or $C_{24}$ saturated fatty acids can be present. Preferably, these reduced calorie fats comprise no more than about 10% $C_{20}$ saturated fatty acid and no more than about 2.5% $C_{24}$ saturated fatty acid, and most preferably no more than about 6% $C_{20}$ saturated fatty acid and no more than about 1.5% $C_{24}$ saturated fatty acid.

The reduced calorie fats can also contain minor amounts of other fatty acids. For example, small amounts of $C_{12}$ to $C_{18}$ saturated fatty acids (e.g., lauric, myristic, palmitic and stearic acids), as well as $C_{18}$ unsaturated fatty acids (e.g., oleic, linoleic and linolenic acids), can be present in the reduced calorie fats, typically due to the sources of fatty acids used in synthesis. These fatty acids can affect the calorie reduction benefits, as well as the mouthmelt, firmness and tempering properties, of these reduced calorie fats. Accordingly, these reduced calorie fats usually comprise no more than about 9%, preferably no more than about 5%, and most preferably no more than about 3% of these other fatty acids.

Preferred and most preferred carbon number profiles (CNP) for these reduced calorie fats are as follows:

| CNP | PREFERRED (%) | MOST PREFERRED (%) |
| --- | --- | --- |
| 32 or lower | <3 | <1 |
| 34 | <2 | <1 |
| 36 | <4 | <2 |
| 38 | 15–40 | 15–30 |
| 40 | 35–60 | 45–55 |
| 42 | 15–35 | 20–30 |
| 44 | <2 | <1 |
| 46 | <1 | <0.6 |
| 48 | <0.8 | <0.6 |
| 50 | <0.6 | <0.5 |
| 52 | <0.4 | <0.3 |
| 54 or higher | <0.9 | <0.4 |

These reduced calorie fats can be synthesized by a wide variety of techniques such as:

(a) random rearrangement of tribehenin and medium chain triglycerides having $C_8/C_{10}$ saturated fatty acids;

(b) esterification of glycerol with a blend of the corresponding fatty acids;

(c) transesterification of a blend of $C_8/C_{10}$ saturated fatty acid methyl esters and behenic fatty acid methyl esters with glycerol; and (d) transesterification of glyceryl behenate with medium chain triglycerides having $C_8/C_{10}$ saturated fatty acids.

Random rearrangement of triglycerides is well known in the art, as is the esterification of glycerol with fatty acids. For discussions on these subjects, see Hamilton et al., *Fats and Oils: Chemistry and Technology* pp. 93–96, Applied Science Publishers Ltd., London (1980), and Swern, *Bailey's Industrial Oil and Fat Products*, 3d ed., pp. 941–943 and 958,965 (1964), which are incorporated by reference. Transesterification is also discussed generally in Bailey's at pp. 958–963.

Fatty acids per se or naturally occurring fats and oils can serve as sources of fatty acids for preparing the reduced calorie fats. For example, hydrogenated high erucic acid rapeseed oil is a good source of behenic acid. Medium chain $C_8/C_{10}$ saturated fatty acids can be obtained from coconut, palm kernel, or babassu oils. They can also be obtained from commercial medium chain triglycerides, such as the Captex 300 brand sold by Capital City Products, of Columbus, Ohio.

Tribehenin, useful for making the present reduced calorie triglycerides, can be prepared from behenic acid or from fractionated methyl behenate by esterification of the acid, or by transesterification of methyl behenate with glycerol. More importantly, blends of behenic acid and medium chain $C_8/C_{10}$ saturated fatty acids can be esterified with glycerol. Similarly, methyl ester blends can also be interesterified with glycerol.

The crude triglyceride mixture resulting from synthesis is typically modified by additional fractionation to provide higher levels of mono-long chain MLM and MML triglycerides in the reduced calorie fats. Solvent and non-solvent crystal fractionation or fractional distillation methods (e.g. molecular distillation as described below) can be used. Standard fractionation methods are discussed in Applewhite, *Bailey's Industrial Oil and Fat Products,* Vol. 3, 4th ed. (1985), pp. 1–39, John Wiley & Sons, New York, which is incorporated by reference. Molecular distillation can separate MML/MLM from LLM/LML triglycerides, and can shift the carbon number concentration, but it cannot fractionate triglycerides having the same carbon number. Non-solvent or solvent crystal fractionation can also fractionate MLM/MML triglycerides from the higher melting LLM/LML triglycerides. The molecular distillation or crystal fractionation of the crude triglyceride mixture is usually repeated several times to increase the level of desired MLM/MML triglycerides in these reduced calorie fats.

Fractional distillation of the crude triglyceride mixture is not limited to molecular distillation, but can also include conventional distillation (continuous or batch). After synthesis of the crude triglyceride mixture, it is common to use a conventional batch distillation technique to remove most of the excess medium chain triglycerides, and then continue with molecular distillation. The vacuum requirements are not as strict, and the temperature used can be higher in conventional distillation versus molecular distillation. The conventional distillation temperature is generally between 405° F. (207° C.) and 515° F. (268.3° C.). The absolute pressure is less than 8 mm Hg, more preferably less than 2 mm Hg. The distillation is aided by sparging with steam, nitrogen or other inert gas (e.g., $CO_2$). The distillation is carried out to remove part of the excess medium chain triglycerides, most of the excess medium chain triglycerides, or to distill also the mono-long chain (MLM and MML) components.

Crystal fractionation of the distilled triglyceride mixture can be carried out with and without solvents, with and without agitation. The crystal fractionation can be repeated several times. Crystal fractionation is particularly effective to remove high melters. Fractionation of the distilled triglyceride mixture without solvents can be used to remove LLM and LML components (predominantly carbon numbers $C_{52}$ and $C_{54}$), which in turn alters the melting profile of these reduced calorie fats.

b. Milkfat and Cocoa Butter

The fat component can tolerate up to certain levels of milkfat and cocoa butter. Milkfat (sometimes referred to as "butterfat") is usually present in the fat component as the result of the inclusion of milk solids in milk chocolate-flavored confectionery compositions. However, milkfat can also be present as the result of the inclusion of butter oil. Milkfat can generally be tolerated in the fat component at levels up to about 15%. For milk chocolate-flavored compositions, as well as pastel coatings (e.g., mint-flavored confectionery coating compositions) that optionally contain cocoa butter, milkfat is typically present in the fat component at a level of from about 4 to about 14%, and preferably at a level of from about 6 to about 12%.

The cocoa butter present in the fat component can be included as an added fat. However, cocoa butter is more typically included as a result of its being present in the source of chocolate flavoring (e.g., cocoa powder, chocolate liquor, or more typically blends thereof) used in the flavored confectionery composition. Cocoa butter can generally be tolerated in the fat component at levels up to about 20%. For chocolate-flavored confectionery compositions, cocoa butter is typically present in the fat component at a level of from about 1 to about 14%, and more preferably at a level of from about 5 to about 12%.

Diglycerides and Other Confectionery Fats

Besides the triglyceride composition of the fat component, the particular level of diglycerides present can also have an important effect on the tempering properties of the flavored confectionery composition. The reduced calorie fat typically contributes most, if not all, of the diglycerides present in the fat component. However, other fats present in the fat component can also contribute a certain portion of diglycerides. For bloom resistance during tempering of the flavored confectionery composition, it is particularly important to minimize the level of diglycerides in the fat component. Up to about 4% diglycerides can be tolerated in the fat component. Preferably, the level of diglycerides in the fat component is no more than about 2%, and most preferably no more than about 1%.

In addition to the reduced calorie fat, milkfat, and cocoa butter, the fat component of the present invention can comprise other compatible confectionery fats. These compatible confectionery fats include cocoa butter substitutes derived from illipe butter (Borneo allow), Shea butter, Mowrah fat and palm oil. Suitable cocoa butter substitutes derived from palm oil are the POP fats disclosed in U.S. Pat. No. 4,594,259 to Baker et al, issued June 10, 1986, which is incorporated by reference. These cocoa butter substitute fats can be included as partial or total replacements for the cocoa butter present in the fat component. However, because of their higher caloric value, these cocoa butter substitute fats are typically not included in the fat component. 3. Other Nonfat Confectionery Ingredients a. Sugars, Sugar Alcohols, and Reduced Calorie Sweeteners

One particularly important nonfat ingredient in these flavored confectionery compositions is sugar. Sugar is typically present in such compositions at from about 35 to about 60%, and preferably at from about 40 to about 55%, of the composition. Especially for chocolate-flavored confectionery compositions, the source of sugar needs to be essentially dry. Sources of sugar include sucrose, fructose, glucose, maltose and mixtures thereof. The sugar typically has a particle size in the range of from about 0.0002 to about 0.0016 inches (from about 5 to about 40 microns) in the finished chocolate-flavored product.

For dietary reasons, the sugar can be completely or partially substituted with a sugar alcohol. Suitable sugar alcohols include sorbitol, xylitol, mannitol and mixtures thereof. For further calorie reduction, the sugar or sugar alcohol can be completely or partially substituted with a reduced calorie sweetener. These reduced calorie sweeteners include, but are not limited to, aspartame, saccharin, alitame, thaumatin, dihydrochalcones, cyclamates, steviosides, glycyrrhizins, synthetic alkoxy aromatics, such as Dulcin and P-4000, sucrolose, suosan, miraculin, monellin, talin, cyclohexylsulfamates, substituted imidazolines, synthetic sulfamic acids such as acesulfame, acesulfam-K and n-substituted sulfamic acids, oximes such as perilartine, rebaudioside-A, peptides such as aspartyl malonates and succanilic acids, dipeptides, amino acid based sweeteners such as gem-diaminoalkanes, meta-aminobenzoic acid, L-aminodicarboxylic acid alkanes, and amides of certain alphaaminodicarboxylic acids and gem-diamines, and 3-hydroxy-4-alkyloxphenyl aliphatic carboxylates or heterocyclic aromatic carboxylates. When these reduced calorie sweeteners are used, it can be desirable to include bulking or bodying agents. Suitable bulking agents include nondigestible carbohydrates, for example, polydextrose.

b. Milk solids

Especially in milk chocolate-flavored compositions and pastel coatings, the flavored confectionery composition can also include milk solids (essentially dry), usually at from about 9 to about 20% of the composition, and typically at from about 12 to about 18%. Suitable sources of essentially dry milk solids can be obtained from cream, milk, concentrated milk, sweetened condensed milk, skim milk, sweetened condensed skim milk, concentrated buttermilk, and the like. (As previously stated, any fat present in the milk solids, such as milkfat, is considered part of the fat component.)

c. Emulsifiers and Other Minor Ingredients

Flavored confectionery compositions usually include an emulsifier to "wet" the sugar particles with the fat component. Suitable emulsifiers include sorbitan monostearate, polysorbate 60, polyglycerol esters, sucrose partial esters, and particularly lecithin. These emulsifiers are usually present at up to about 1.5% of the composition, and typically at up to about 0.5%. Preferred levels of emulsifier are from about 0.05 to about 0.5%. Other minor ingredients such as salt normally present in fat-based confections can be included, as well as optional components, such as the pharmaceutical actives disclosed at column 7, lines 1-35 of U.S. Pat. No. 4,786,502 to Chapura et al, issued Nov. 22, 1988, which is incorporated by reference.

Tempering the Flavored Confectionery Composition

These flavored confectionery compositions are tempered according to the tempering process of the present invention. The following discussion of this tempering process will generally be with regard to tempered chocolate-flavored confectionery products, which are highly preferred products prepared according to the present invention. However, this tempering process can also be used to prepare nonchocolate-flavored confectionery products (e.g. pastel coatings) by using the same or similar steps.

Initially, a temperable chocolate-flavored confectionery composition is formed using standard techniques for making cocoa butter-based chocolate. Some typical chocolate formulations include milk chocolate-flavored compositions, and dark chocolate-flavored compositions. In addition to the reduced calorie fat, milk chocolate-flavored compositions typically comprise sugar, cocoa powder, optionally chocolate liquor, milk solids, lecithin as the emulsifier, and other confectionery ingredients such as salt. Dark chocolate-flavored compositions are similar to milk chocolate-flavored compositions but typically do not include milk solids.

The total fat present in these chocolate-flavored formulations can be adjusted to provide the desired viscosity. For molding or depositing applications, the amount of total fat is preferably lower. For enrobing applications, the amount of total fat is preferably higher. The ratios of sugar, cocoa powder, chocolate liquor, and milk solids can vary depending upon the flavor desired.

The chocolate-flavored formulations are prepared by mixing the ingredients to "wet" them with the reduced calorie fat and to provide a consistency suitable for the subsequent refining step. During this mixing step, sugar, milk solids, salt, cocoa powder and optionally a portion of the total lecithin are added to a mixer. Then, the melted chocolate-liquor (if any) and a portion of the reduced calorie fat are added to the mixer. These ingredients are stirred for a period of time sufficient to "wet" the dry ingredients with the fat. The particular time period is not critical and is typically about 15 minutes. During this mixing step, the contents of the mixer are heated to a temperature of at least about 100° F. (37.8° C.) Contact with moisture is avoided during this step. The consistency of the chocolate flavored formulation after mixing is typically that of soft putty.

After mixing, the chocolate-flavored formulation is refined to reduce the solids, in particular the sugar, to the desired particle size, typically in the range of from about 0.0002 to about 0.0016 inches (from about 5 to about 40 microns). This refining step also coats the solids with the fat. Typically, four or five water-cooled rolls, each progressively faster in speed, are used to refine the formulation. Pressure between the rolls is adjusted to achieve the desired fineness for the solids. As in the dry mixing step, contact with moisture is avoided during refining. In particular, the rolls are not cooled to or below the dewpoint of ambient air. The consistency of the chocolate-flavored formulation after refining is typically that of flakes.

After refining, the chocolate-flavored formulation is dry-conched to remelt and redistribute the fat to the surface of the solids in the refined mix. The moisture content of the mix is reduced to about 1% or less. Certain volatile compounds are also removed which improves the flavor. In this dry conching step, flakes from the refining step are first broken into a powdery mass in a mixer which is typically heated to at least about 100° F. (37.8° C.). When this temperature is reached, the mass has the consistency of lumps of firm putty. The contents of the mixer can be adjusted to temperatures in the range of from about 100° to about 160° F. (from about 37.8° to about 71.1° C.) for milk chocolate-flavored formulations and to temperatures in the range of from about 120° to about 180° F. (from about 48.9° to about 82.2° C.) for dark chocolate-flavored formulations. The total time required for this dry-conching step can typically range from about 1 to about 10 hours.

After dry-conching, the chocolate-flavored formulation is wet-conched. During wet-conching, a portion of the reduced calorie fat and optionally lecithin are added and then mixed to provide a viscous fluid mass. The contents of the mixer can be adjusted to temperatures in the range of from about 110° to about 180° F. (from about 43.3° to about 82.2° C.), the particular temperature depending upon the particular chocolate-flavored formulation. The total time required for this wet-conching step can typically range from about 5 to about 20 hours. After this wet-conching step, the remaining reduced calorie fat and lecithin are added to adjust the viscosity of the mass to that required for the intended application. Mixing is continued, typically for about 10 to about 60 minutes. The temperature is also typically reduced to in the range of from about 80° to about 90°

F. (from about 26.7° to about 32.2.° C.) to provide a fluid or liquid chocolate-flavored mass.

The fluid/liquid chocolate-flavored mass is then ready for molding, depositing or enrobing applications. Molding and depositing applications include the formation of chocolate-flavored bars and chocolate chips, while enrobing applications include candy bars and cookies covered with a chocolate-flavored coating. In molding or deposited applications, the fluid/liquid chocolate-flavored mass is simply poured into the appropriate mold or deposited onto a flat surface such as a moving belt. In enrobing applications, the fluid/liquid chocolate-flavored mass is applied to the appropriate substrate such as a confectionery nougat center or cookie center using conventional enrobing equipment.

The molded, deposited or enrobed chocolate-flavored product is then rapidly cooled to a temperature of about 57° F. (13.9° C.) or less. As used herein, "rapidly cooled" refers to a temperature decrease at a rate sufficient to cause the reduced calorie fat present in the chocolate-flavored confectionery mass to form the sub $\alpha$ phase. For example, an average cooling rate of from about 1° to about 5° F. per minute has been found suitable in causing the reduced calorie fat to form the sub $\alpha$ phase. Preferred average cooling rates are from about 2° to about 4° F. per minute.

The particular temperature to which the molded, deposited or enrobed product is cooled has also been found to be important. For example, cooling the molded/deposited/enrobed product to very low temperatures can slow the rate of desirable $\beta$-3 crystal formation. On the other hand, cooling the molded/deposited/enrobed product to a temperature above about 57° F. (13.9° C.) can cause the reduced calorie fat to form the $\alpha$ phase, rather than the desired sub $\alpha$ phase. (Once in the $\alpha$ phase, the reduced calorie fat can slowly transform directly into the $\beta$-3 phase, but causes bloom formation.)

Accordingly, the product is preferably cooled to a temperature in the range of from about 30° to about 55° F. (from about $-1.1$ to about 12.8° C.). The particular temperature in this preferred range to which the product is cooled can also depend on the ratio of $C_8$ to $C_{10}$ saturated fatty acids present in the reduced calorie fat. For reduced calorie fats having higher ratios of $C_8$ to $C_{10}$ saturated fatty acids (i.e., closer to about 2.5:1), the product is typically cooled to a temperature in the range of from about 30° to about 50° F. (from about $-1.1$° to about 10° C.). For reduced calorie fats having lower ratios of $C_8$ to $C_{10}$ fatty acids (i.e., closer to about 1:2.5), the product is typically cooled to a temperature in the range of from about 45° to about 55° F. (from about 7.2° to about 12.8° C.). This rapid cooling can be carried out in a conventional cooling tunnel.

Once the chocolate-flavored product has been cooled to the appropriate temperature, it is sufficiently firm to be wrapped or otherwise packaged. The cooled product is then held (tempered) at a temperature (or more typically various temperatures) of about 57° F. (13.9° C.) or less for a period of time sufficient to form an effective amount of $\beta$-3 crystals from a portion of the sub $\alpha$ phase of the reduced calorie fat. Again, holding the cooled product at very low temperatures can slow the rate of desirable $\beta$-3 crystal formation and the resulting transformation of the remaining reduced calorie fat into the $\beta$-3 phase. Accordingly, the cooled product is preferably held (tempered) at a temperature(s) in the range of from about 30° to about 55° F. (from about $-1.1$° to about 12.8° C.). For reduced calorie fats having higher ratios of $C_8$ to $C_{10}$ saturated fatty acids, the cooled product is typically tempered at a temperature(s) in the range of from about 30° to about 50° F. (from about $-1.1$° to about 10° C.). For reduced calorie fats having lower ratios of $C_8$ to $C_{10}$ fatty acids, the product is typically tempered at a temperature(s) of in the range from about 45° to about 55° F. (from about 7.2° to about 12.8° C.).

Even when the cooled product is held at temperatures in the range of from about 30° to about 55° F. (from about $-1.1$° to about 12.8° C.), the formation of $\beta$-3 crystals from the sub $\alpha$ phase of the reduced calorie fat can occur at a slow rate. Accordingly, the cooled product needs to be held in this cooler temperature range for a period of time sufficient to form an effective amount of $\beta$-3 crystals. Generally, the longer the cooled product is held at these lower temperatures, the greater will be the formation of $\beta$-3 crystals. Under some circumstances (e.g., minimal/no milkfat in product, inclusion of some $\beta$-3 seed crystal material, tempering at close to 55° F. (12.8° C.), very gradual warming of cooled product after tempering) holding the cooled product for at least about 2 hours at these cooler temperatures can be adequate to generate an effective amount of $\beta$-3 crystals. Usually, holding the cooled product at these lower temperatures for at least about 16 hours is sufficient to form an effective amount of $\beta$-3 crystals under most circumstances. Preferably, the cooled product is held at these lower temperatures for at least about 40 hours (typically from about 44 to about 72 hours) to form even greater amounts of $\beta$-3 crystals. This holding step can be carried out in a controlled temperature storage environment, e.g. a controlled temperature warehouse or refrigerated truck.

After the cooled chocolate-flavored product has been held at these cooler temperatures for a sufficient period of time to generate an effective amount of $\beta$-3 crystals in the reduced calorie fat, it is armed to a temperature in the range of from above about 57° to about 72° F. (from about 13.9° to about 22.2° C.), and preferably to a temperature in the range of from about 60° to about 70° F. (from about 15.6° to about 21.1° C.). The cooled product needs to be tempered for sufficient period of time in this higher temperature range in order to permit the remaining portion of the reduced calorie fat to transform into a stable $\beta$-3 phase. Also, the rate at which this cooled product is warmed needs to be such that the $\beta$-3 phase formed does not melt. (Bloom formation will likely result if the reduced calorie fat does not completely transform into the $\beta$-3 phase, or if a sufficient portion of the $\beta$-3 phase melts, i.e. dissolves in the remaining liquid phase.)

The particular manner in which this cooled product is warmed is often dependent on the length of time, and temperature at which, the cooled product was tempered at lower temperatures, i.e. about 57° F. (13.9°) or less. For example, cooled products that have been tempered at about 50° F. (10° C.) for from about 16 to about 24 hours or shorter usually require very gradual, stepwise warming, e.g. gradual warming to about 60° F. (15.6° C.) initially, then gradual warming to about 70° F. (21.1° C.). By contrast, cooled products that have been tempered at about 50° F. (10° C.) for from about 44 to about 72 hours or longer can be warmed more rapidly to a single temperature, e.g. to about 60° F. (15.6° C.) or about 70° F. (21.1° C.). Within these guidelines, average warming rates in the range of from about 0.5° to about 60° F. per hour have been found adequate to permit transformation of the remaining portion of the reduced calorie fat into a stable β-3 phase without melting the formed β-3 phase. Preferably, the average warming rate is from about 1° to about 10° F. per hour. Also, holding (tempering) the warmed product in this higher temperature range (preferably from about 60° to about 70° F. (from about 15.6° to about 21.1° C.)) for at least about 1 hour, and preferably for at least about 4 hours, has been found adequate to complete transformation of the reduced calorie fat into a stable β-3 phase. Typically, the warmed product is tempered in this higher temperature range for from about 4 to about 120 hours. This warming step can be carried out in a controlled temperature storage environment, e.g., a controlled temperature warehouse or refrigerated truck.

Because the tempering process of the present invention generates β-3 crystals in situ in the reduced calorie fat, the inclusion of preformed β-3 seed crystals in the chocolate-flavored formulation is not required. However, the inclusion of minor amounts (e.g., from about 5 to about 10%) of β-3 seed crystal material in the fluid/liquid chocolate-flavored mass prior to tempering can be desirable. In particular, the inclusion of such β-3 seed material can be helpful in decreasing the tempering time required at cooler (i.e., below 57° F. (13.9° C.)) and warmer (i.e., above 57° F. (13.9° C.)) temperatures. This β-3 seed material can be obtained by subjecting a portion of the refined chocolate-flavored formulation to the tempering process of the present invention.

The preferred tempering conditions used in the process of the present invention (i.e. tempering the cooled product at temperatures in the range of from about 30° to about 55° F. (from about −1.1° to about 12.8° C.) for at least about 40 hours) have been found to be particularly important in providing tempered chocolate products which are resistant to bloom formation after thermal stress. Bloom formation can occur when a tempered chocolate-flavored product is warmed to a temperature of about 8° F. (26.7° C.) or higher for a period of time sufficient to liquify a portion of the fat phase. If the product is resistant to thermal stress, the liquified fat phase will convert back to and become part of the solid β-3 phase when cooled to a temperature of about 70° F. (21.1° C.) or lower If the product is not resistant to thermal stress, the liquified fat phase will separate from the remaining solid β-3 phase. Upon cooling of the product to about 70° F. (21.1° C.) or lower, the liquified phase will form large fat crystals which show up as whitish or grayish streaks on the surface and sometimes the interior of the product. These grayish or whitish streaks are what is referred to as "bloom."

The importance of the preferred tempering conditions used in the process of the present invention in terms of resistance to bloom formation after thermal stress is particularly shown by certain experiments. In these experiments, 10 g. samples of a chocolate-flavored confectionery composition according to the present invention were deposited in liquified form in plastic petri dishes. These samples were subjected to different tempering conditions, followed by thermal stress at temperatures of 80° F. (26.7° C.) or 85° F. (29.4° C.). The thermally stressed samples were then cooled to 70° F. (21.1° C.) and evaluated after 24+hours for bloom formation. Bloom scores ranged from 0 (no bloom) to a high of 10 (highest amount of bloom formation). A bloom score of less than 0.5 was considered to show resistance to thermal stress.

The particular tempering conditions, thermal stress conditions and bloom scores for these experiments are shown in the following table:

| | Tempering Conditions (Hrs.) | | | Thermal Stress (Hrs.) | | |
|---|---|---|---|---|---|---|
| Exp. No. | At 50° F. (10° C.) | At 60° F. (15.6° C.) | At 70° F. (21.1° C.) | At 80° F. (26.7° C.) | At 85° F. (29.4° C.) | Bloom Score At 24 + hrs. |
| 1 | 16 | 8 | 16 | 4 | — | 0.0 |
| 2 | 16 | 8 | 16 | — | 4 | 0.0 |
| 3 | 16 | 8 | — | 16 | — | 7.0 |
| 4 | 16 | 8 | — | — | 16 | 10.0 |
| 5 | 16 | 8 | 144 | 24 | — | 1.0 |
| 6 | 16 | 8 | 144 | — | 24 | 2.0 |
| 7 | 20 | 24 | — | 4 | — | 0.5 |
| 8 | 20 | 24 | — | — | 4 | 1.0 |
| 9 | 20 | 144 | — | 24 | — | 0.5 |
| 10 | 20 | 144 | — | — | 24 | 1.0 |
| 11 | 24 | 144 | — | 24 | — | 0.5 |
| 12 | 24 | 144 | — | — | 24 | 1.0 |
| 13 | 44 | — | 4 | 4 | — | 0.0 |
| 14 | 44 | — | 4 | — | 4 | 0.0 |
| 15 | 48 | — | 4 | 136 | — | 0.0 |
| 16 | 48 | — | 4 | — | 136 | 0.2 |
| 17 | 48 | — | 120 | 24 | — | 0.0 |
| 18 | 48 | — | 120 | — | 24 | 0.0 |
| 19 | 48 | 120 | — | 24 | — | 0.0 |
| 20 | 48 | 120 | — | — | 24 | 0.0 |

As shown by Experiments 1–12, samples that were tempered at 50° F. (10° C.) for only 16 to 24 hours had relatively minimal resistance to bloom formation when subjected to thermal stress. By contrast, as shown by Experiments 13–20, tempering at 50° F. (10° C.) for 44 to 48 hours (i.e., according to the preferred process of the present invention) provided maximum stability against bloom formation, even when the samples were subjected to thermal stress for periods upwards of 136 hours.

The chocolate-flavored products resulting from the tempering process of the present invention have a firmness and mouthmelt comparable to that of cocoa butter-based chocolate products. The desirable mouthmelt properties of these chocolate-flavored products is particularly shown by differential scanning calorimetry (DSC). As measured by DSC, the chocolate-flavored products obtained by the tempering process of the present invention completely melt at a temperature of from 94° to 96° F. (from 34.4° to 35.6° C.). Most of the melting of these chocolate-flavored products also occurs in a fairly narrow temperature range of from 80° to 94° F. (from 26.7° to 34.4° C.).

D. Analytical Methods

1. CNP/HPLC Method

The carbon number profile of the triglycerides present in the reduced calorie fat can be measured by high performance liquid chromatography (HPLC). A fat sample to be analyzed is injected on a reverse phase liquid chromatograph (LC) equipped with a mass (evaporative light scattering) detector. A linear gradient of increasing methylene chloride in acetonitrile is used to separate all of the triglycerides based on fatty acid chain length. Retention time increases with increasing fatty acid chain length. Thus, medium chain triglycerides are eluted first, followed by mono-long chain, di-long chain and then tri-long chain triglycerides.

| Apparatus | |
|---|---|
| Dispensers | 1 mL, American Scientific #P4952-1, or equivalent, American Scientific Products, 1430 Waukegan Rd., McGaw Park, IL 60085 |
| Pasteur pipets, glass | Fisher #13-678-7A, or equivalent, Fisher Scientific Co., 203 Fisher Bldg., Pittsburgh, PA 15219 |
| Vials, glass | 2 dram with foil-lined cap |
| Autosampler vials | 2 mL, Fisher #03-340-SG, Fisher Scientific Co. |
| Vial caps | PTFE Rubber, Fisher #03-340-13C, Fisher Scientific Co. |
| LC columns | 2 Beckman Ultrasphere ODS, 5 μm, 0.46 cm i.d. × 25 cm, Beckman Instruments, Inc., 2500-T Harbor Blvd., Fullerton, CA 92634 |
| LC system | Hewlett-Packard 1090L with Ternary DR5 pump, variable volume injector, autosampler, heated column compartment and column switching valve, Hewlett-Packard Co., Scientific Instruments Div., 1601-T California Ave., Palo Alto, CA 94304 |
| Mass detector | Applied Chromatography Systems #750/14, Varex Corp., 12221 Parklane Dr., Rockville, MD 20852 |
| Recorder | Kipp & Zonen #BD40, or equivalent, Kipp & Zonen, Div. of Enraf-Nonius, 390-T Central Ave., Bohemia, NY 11716 |
| Laboratory Automation System (LAS) | Hewlett-Packard 3357, or equivalent, Hewlett-Packard Co., Scientific Instruments Div. |
| Filters | Gelman #4451, 0.2 μm, or equivalent, Gelman Instrument Co., 605-T S. Wagner Rd., Ann Arbor, MI 48106 |
| Solvent Clarification kit | Waters #85124, Waters Instruments, Inc., 2411-T 7th St. N.W., Rochester, MN 55901 |
| Syringe | 5 ml, disposable, Fisher #14-823-200, or equivalent, Fisher Scientific Co. |
| Reagents | |
| Methylene chloride | Burdick and Jackson, UV Grade, American Scientific #300-4L, American Scientific Products |
| Acetonitrile | Burdick and Jackson, UV Grade, American Scientific #015-4L, American Scientific Products |

SAMPLE PREPARATION

1. Weigh 0.1 g of the melted sample into a 2 dram vial.
2. Dispense 1 mL of methylene chloride into vial and mix thoroughly.
3. Filter the sample solution through a 0.2 μm filter into an autosampler vial.

LAS METHOD AND SEQUENCE PREPARATION

1. Set up the integration method, referring to the HP-3357 Quick Reference Guide for instructions. The calibration table is shown in Table 2.
2. Set up a LAS sample sequence for the appropriate number of samples, Refer to the Reference Guide as necessary.

TABLE 2

Calibration Table

| | Time | Factor | Amount | Peak Name |
|---|---|---|---|---|
| 1. | 3.48 | 1.000000 | 1.000000 | C22 |
| 2. | 3.80 | 1.000000 | 1.000000 | C24 |
| 3. | 4.18 | 1.000000 | 1.000000 | C26 |
| 4. | 4.30 | 1.000000 | 1.000000 | C28 |
| 5. | 4.65 | 1.000000 | 1.000000 | C30 |
| 6. | 5.32 | 1.000000 | 1.000000 | C32 |
| 7. | 6.01 | 1.000000 | 1.000000 | C34 |
| 8. | 6.80 | 1.000000 | 1.000000 | C36 |
| 9. | 7.87 | 1.000000 | 1.000000 | C38 |
| 10. | 8.98 | 1.000000 | 1.000000 | C40 |
| 11. | 10.31 | 1.000000 | 1.000000 | C42 |
| 12. | 11.88 | 1.000000 | 1.000000 | C44 |
| 13. | 13.49 | 1.000000 | 1.000000 | C46 |
| 14. | 15.35 | 1.000000 | 1.000000 | C48 |
| 15. | 17.28 | 1.000000 | 1.000000 | C50 |
| 16. | 19.49 | 1.000000 | 1.000000 | C52 |
| 17. | 21.60 | 1.000000 | 1.000000 | C54 |
| 18. | 23.87 | 1.000000 | 1.000000 | C56 |
| 19. | 26.18 | 1.000000 | 1.000000 | C58 |
| 20. | 28.50 | 1.000000 | 1.000000 | C60 |
| 21. | 30.77 | 1.000000 | 1.000000 | C62 |
| 22. | 33.03 | 1.000000 | 1.000000 | C64 |
| 23. | 35.24 | 1.000000 | 1.000000 | C66 |

LC OPERATION

A. Start-up

1. Turn on power for the HP1090.
2. Filter all solvents with filtration apparatus.
3. Fill reservoirs with filtered solvent; reservoir A contains acetonitrile and reservoir B contains methylene chloride. Open helium toggle valve on back of LC and degas solvents for at least 5–10 minutes. Close helium toggle valve.
4. Set the mass detector to the following settings:
   Attenuation: 2
   Photomultiplier: 2
   Time Constant: 5
   Evaporator Setting: 50
   Nitrogen: 12 psi
5. Set up the mobile phase gradient method in Table 3 on the HP1090 as necessary. Refer to HP1090 Operator's Handbook for programming directions. Once the method is programmed, it will remain in the memory until it is erased, even with power off or instrument unplugged.

TABLE 3
Mobile Phase Gradient Program

```
METHOD 1
TMCT
SDS CONFIG A = 1 B = 1 C = 0
FLOW = 2
% B = 35 C = 0
OVEN = 40 INJ VOL = 10 SLOWDOWN = 5
MAX PRESS = 300
MIN PRESS = 0
STOP TIME = 40.1
POST TIME = 5
COLUMN SWITCH = 0
E = 0 0 0 0
AT 0 E4 = 1
AT 0% B = 35% C = 0
AT .1 E4 = 0
AT 40% B = 55% C = 0
```

B. Autosample Operation

1. Place the filled autosample vials in autosampler holder starting with space "0". Autosampler starts numbering with "0" and the LAS starts numbering with "1", thus the sequence number are shifted by one.
2. Program and start the autosampler for number of injections, refer to handbook

Reference Standards

A reference standard is used to insure proper LC/detector operation and to verify the identification of the triglyceride peaks. Typically, a well-characterized material is used. When such material is not available, a commercial material such as Nu Chek Prep 50A and 51A can be substituted (Nu Chek Prep, Inc , P.O. Box 172, Elysian, Minn. 56028). The reference standard is analyzed each day prior to sample analyses.

Results

1. As each sample is analyzed, the LAS will generate a report according to the instructions of the integration method (Table 2). The report lists peak number, retention time, and area percent for a given carbon number of the triglyceride sample.
2. Since retention times of peaks will shift as a function of column usage, verify the proper identification of the reference standards peaks. If peaks are mislabelled, modify the retention time table of the integration method and reanalyze the sequence to generate the new reports.
3. A chromatogram is often helpful to understand the data. Use CPLOT to generate a chromatogram.

2. CNP/GC Method

The carbon number profile (CNP) of the triglycerides present in the reduced calorie fat can also be determined by programmed temperature-gas chromatography (GC) using a short fused silica column coated with methyl silicone for analysis and characterization of the composition by molecular weight. The triglycerides are separated according to their respective carbon numbers, wherein the carbon number defines the total number of carbon atoms on the combined fatty acid residues. The carbon atoms on the glycerol molecule are not counted. Glycerides with the same carbon number will elute as the same peak. For example, a triglyceride composed of three $C_{16}$ (palmitic) fatty acid residues will co-elute with triglycerides made up of one $C_{14}$ (myristic), one $C_{16}$ and one $C_{18}$ (stearic) fatty acid residue or with a triglyceride composed of two $C_{14}$ fatty acid residues and one $C_{20}$ (arachidic) fatty acid residue.

Preparation of the fat sample for analysis is as follows: 1.0 ml. of a tricaprin internal standard solution (2 microg./ml.) is pipetted into a vial. The methylene chloride solvent in the standard solution is evaporated using a steam bath under a nitrogen stream. Two drops of the fat sample (20 to 40 microg.) are pipetted into a vial. If the fat sample is solid, it is melted on a steam bath and stirred well to insure a representative sample. 1.0 ml. of bis (trimethylsilytrifluoroacetamide) (BSTFA) is pipetted into the vial which is then capped. The contents of the vial are shaken vigorously and then placed in a beating block (temperature of 100° C.) for about 5 minutes.

For determining the CNP/GC of the prepared fat samples, a Hewlett-Packard 5880A series gas chromatograph equipped with temperature programming and a hydrogen flame ionization detector is used together with a Hewlett-Packard 3351B data system. A 2 m. long, 0.22 mm. diameter fused silica capillary column coated with a thin layer of methyl silicone (Chrompak CP-SIL 5) is also used. The column is heated in an oven where temperature can be controlled and increased according to a specified pattern by the temperature programmer. The hydrogen flame ionization detector is attached to the outlet port of the column. The signal generated by the detector is amplified by an electrometer into a working input signal for the data system and recorder. The recorder prints out the gas chromatograph curve and the data system electronically integrates the area under the curve. The following instrument conditions are used with the gas chromatograph:

Septum purge 1 ml./min.
Inlet pressure 5 lbs./in.$^2$
Vent flow 75 ml./min.
Makeup carrier 30 ml./min.
Hydrogen 30 ml./min
Air 400 ml./min.

1.0 microl. of the prepared fat sample is taken by a gas-tight syringe and injected into the sample port of the gas chromatograph. The components in the sample port are warmed up to a temperature of 365° C. and swept by a helium carrier gas push the components into the column. The column temperature is initially set at 175° C. and held at this temperature for 0.5 min. The column is then heated up to a final temperature of 355° C. at a rate of 25° C./min. The column is maintained at the final temperature of 355° C. for an additional 2 min.

The chromatographic peaks generated are then identified and the peak areas measured. Peak identification is accomplished by comparison to known pure glycerides previously programmed into the data system. The peak area as determined by the data system is used to calculate the percentage of glycerides having a particular Carbon Number ($C_N$) according to the following equation:

$$\% \ C_N = (Area \ of \ C_N/S) \times 100$$

wherein S=sum of Area of $C_N$ for all peaks generated.

The Area of $C_N$ is based upon the actual response generated by the chromatograph multiplied by a response factor for glycerides of the particular Carbon Number. These response factors are determined by comparing the actual responses of a mixture of pure glycerides of various Carbon Numbers to the known amounts of each glyceride in the mixture. A glyceride generating an actual response greater than its actual amount has a response factor less than 1.0; likewise, a glyceride generating a response less than that of its actual amount has a response factor of greater than 1.0. The mixture of glycerides used (in a methylene chloride solution) is as follows:

| Component | Carbon No. | Amount (mg./ml.) |
|---|---|---|
| Palmitic acid | 16 | 0.5 |
| Monopalmitin | 16 | 0.5 |
| Monostearin | 18 | 0.5 |
| Dipalmitin | 32 | 0.5 |
| Palmitostearin | 34 | 0.5 |
| Distearin | 36 | 0.5 |
| Tripalmitin | 48 | 1.5 |
| Dipalmitostearin | 50 | 1.5 |
| Distearopalmitin | 52 | 1.5 |
| Tristearin | 54 | 1.5 |

B. Fatty Acid Composition

Principle

The fatty acid composition of the triglycerides present in the reduced calorie fat is measured by gas chromatography. First, fatty acid ethyl esters of the triglycerides are prepared by any standard method (e.g., by transesterification using sodium ethoxide), and then separated on a capillary column which is coated with DB-WAX stationary phase. The fatty acid ethyl esters are separated by chain length and degree of unsaturation. A split injection is made with flame ionization detection. Quantitation is performed by use of a double internal standard method. This method can separate fatty acid ethyl esters from C6 to C24.

| Equipment | |
|---|---|
| Gas Chromatograph | Hewlett-Packard 5890, or equivalent, equipped with a split injector and flame ionization detector, Hewlett-Packard Co., Scientific Instruments Div., 1601-T California Ave., Palo Alto, CA 94304 |
| Autosampler | Hewlett-Packard 7673A, or equivalent |
| Injector column | |
| Column | 15 m × 0.25 mm I.D., fused silica capillary column coated with DB-WAX (0.25 micron film thickness), Hewlett-Packard Co., Scientific Instruments Div. |
| Data System | Hewlett-Packard 3350, 3000-T Hanover St., Palo Alto, CA 94304 |
| Recorder | Kipp & Zonen, BD40, Kipp & Zonen |
| Reagent | |
| Hexane | Burdick & Jackson, or equivalent, American Scientific Products |

Reference Standards

Two reference standards are used each day of operation to verify proper operation of this method. (1) A reference mixture of fatty acid methyl esters (FAME) is used to check the operation of the instrument. This reference mixture has the following fatty acid composition: 19 $C_{14:0}$, 4% $C_{16:0}$, 3% $C_{18:0}$, 45% $C_{18:1}$, 15% $C_{18:2}$, 3% $C_{18:3}$, 3% $C_{20:0}$, 3% $C_{22:0}$, 20% $C_{22:1}$, and 3% $C_{24:0}$. (2) A reference standard of a commercial shortening is used to check the operation of the total system —ethylation and gas chromatographic analysis. The shortening reference standard has the following fatty acid composition: 0.5% $C_{14:0}$, 21.4% $C_{16:0}$, 9.2% $C_{18:0}$, 40.3% $C_{18:1}$, 23.0% $C_{18:2}$, 2.2% $C_{18:3}$, 0.4% $C_{10:0}$, 1.3% $C_{20:1}$, and 0.3% $C_{22:0}$.

The reference mixture of FAME should be diluted hexane and then injected into the instrument. A new vial of FAME reference mixture should be opened every day since the highly unsaturated components, $C_{18:2}$ and $C_{18:3}$, oxidize easily. The shortening reference standard should be ethylated with the samples prior to their analysis by capillary gas chromatography. The results from the reference standards should be compared with the known values and a judgment made concerning the completed analysis. If the results of the reference standards are equal to or within ± standard deviations of the known values, then the equipment, reagents and operations are performing satisfactorily.

OPERATION

A. Instrumental Set-up

1. Install the column in the gas chromatograph, and set up the instrumental conditions as in Table 4.
2. Set up the data system with the appropriate method to acquire and analyze the data. The retention times may have to be adjusted in the method due to instrument variations. Consult the data system reference manual on how to do this—HP3350 User's Reference Manual. Unity response factors are used for each component.
3. Obtain the shortening reference standard for analysis with the samples and ethylate it with the samples.

TABLE 4

| INSTRUMENTAL CONDITIONS | |
|---|---|
| Instrument | Hewlett-Packard 5890 |
| Column | 15 m × 0.25 mm I.D., coated with DB-WAX, 0.25 μ film thickness |
| Column head pressure | 12.5 psi |
| Carrier gas | Helium |
| Injector "A" temperature | 210° C. |
| Split vent flow | 100 mL/min |
| Septum purge | 1.5 mL/min |
| Oven temperature profile: | |
| Initial temperature | 110° C. |
| Initial time | 1 min |
| Rate 1 | 15° C./min |
| Final temp 1 | 170° C. |
| Final time 1 | 0 min |
| Rate 2 | 6° C./min |
| Final temp 2 | 200° C. |
| Final time 2 | 0 min |
| Rate 3 | 10° C./min |
| Final temp 3 | 220° C. |
| Final time 3 | 8 min |
| Detector | FID |
| Detector temp | 230° C. |
| Make-up gas | 30 mL/min |
| Detector $H_2$ flow | 30 mL/min |
| Detector air flow | 300 mL/min |

B. Analysis of Samples—(The samples are analyzed with a double internal standard.)

1. Dilute the reference mixture of FAME with hexane. The methyl esters should be approximately 2% in hexane. Inject one microliter of this solution via the autosampler. The results must meet the criteria in the Reference Standards section.

2. Prepare the triglyceride samples to be analyzed by adding two different internal standards, $C_9$ and $C_{21}$ triglycerides. ($C_9$ and $C_{21}$ triglycerides are commercial standards consisting of 100% 9-carbon and 21-carbon triglycerides, respectively.) The internal standards are added to the samples at about 10% by weight of the sample. The samples (including the internal standards) are then converted to ethyl esters by any standard method.
3. Set up a sequence in the LAS data system to inject the samples.
4. Activate the autosampler to inject 1.0 microl. of the samples in the sequence. The gas chromatograph will automatically begin its temperature program and the data system will collect and analyze the data for the sequence.
5. The data is analyzed with the two internal standard procedure. The absolute amount (mg of esters per gram of sample) of the $C_6$ through $C_{16}$ components is calculated from the $C_9$ internal standard. The absolute amount of the $C_{18}$, $C_{20}$, $C_{22}$ and $C_{24}$ components is calculated from the $C_{21}$ internal standard. Weight percentages of fatty acids are calculated from these amounts.

E. Specific Illustrations of Tempering Process According to Present Invention The following are specific illustrations of the tempering process in accordance with the present invention:

EXAMPLE 1

A chocolate-flavored molding composition is formulated from the following ingredients:

| Ingredient | Amount (g.) |
| --- | --- |
| Reduced calorie fat | 1130.7 |
| Chocolate liquor | 152.0 |
| Lecithin | 4.0 |
| Cocoa powder (10–12% fat) | 208.0 |
| Whole milk solids (26% fat) | 388.0 |
| Nonfat milk solids | 140.0 |
| Vanillin | 2.0 |
| Sucrose | 1948.0 |

The reduced calorie fat used in this chocolate-flavored composition is prepared generally as follows: Compritol 888 (a mixture of approximately 25% monobehenin, 50% dibehenin and 25% tribehenin, sold by Gattefosse of 200 Sawmill River Road, Hawthorne, N.Y.) is further esterified at 265° C. with capric fatty acid until the diglyceride concentration of the mixture is reduced to less than 4%. The weight ratio of Compritol 888 to capric fatty acid at the start of esterification is 70:30. The resulting esterified mixture is deodorized at 26° C. for 3 hours and then combined with Captex 355 (a mixture of $C_8/C_{10}$ medium chain triglycerides, sold by Capital City Products, of Columbus, Ohio) in a weight ratio of 58:42. This mixture is randomly rearranged (randomized) at a temperature of 80° C. for 20 minutes using 0.06% sodium methoxide as the catalyst, neutralized with phosphoric acid and then filtered to remove sodium phosphate. The randomized mixture (approximately 2.5% diglycerides, 38.5% medium chain (MMM) triglycerides, 43.5% mono-long chain (MLM/MML) triglycerides, 13.5% di-long chain (LLM/LML) triglycerides, and 1% tri-long chain (LLL) triglycerides), is steam stripped at a temperature of 450° F. to 515° F. (232.2° to 268.3° C.) during which a major portion of the medium chain triglycerides are distilled off. The stripped residue (2.5% diglycerides, 6% medium chain triglycerides, 67% mono-long chain triglycerides, and 24% di-long chain triglycerides) is then passed three times at gradually increasing temperatures through two 14 inch molecular stills (connected in series) to increase the level of mono-long chain triglycerides. The molecular stills are operated under the following conditions:

Bell jar pressure: 5–11 microns Hg. abs.
Rotor feed temperature: 125°–160° C.
Rotor residue temperature: 180°–216° C.
Initial feed pump rate: 36–40 lbs./hour
Distillation rate: 4–6 lbs./hour per unit The distillate fractions obtained (total of 25) contain 1% medium chain triglycerides, 92% mono-long chain triglycerides, and 5–6% di-long chain triglycerides. Each of these distillate fractions are subjected to non-solvent fractionation, first at 80° F. (26.7° C.) and then at 76° F. (24.4° C.). The liquid (olein) fractions obtained are combined to provide a reduced calorie fat having the following carbon number profile (CNP):

| CNP | % |
| --- | --- |
| 32 | 0.1 |
| 34 | 0.5 |
| 36 | 1.7–2.0 |
| 38 | 21.7–22.9 |
| 40 | 48.0–48.6 |
| 42 | 23.9–24.7 |
| 44 | 0.7–1.0 |
| 46 | 0.2 |
| 48 | 0.2 |
| 50 | 0.2 |
| 52 | 0.1 |

The chocolate-flavored molding composition is processed in two batches of equal size. The cocoa powder, whole milk solids, nonfat milk solids, vanillin and sucrose are blended, and then the melted chocolate liquor is added along with 720.8 g. of the reduced calorie fat. After blending, this mixture is refined twice using a Lehman Four-Roll Refiner (200 psi NIP pressure). This refined mix (3381.4 g.) is dry conched 2½ to 3 hours at 145° F. (62.8° C.) using a Hobart C-100 Mixer set at speed #2. An additional 257.4 g. of reduced calorie fat is added, and the temperature of the mix is then reduced to 125° F. (51.7° C.). The mix is then wet-conched at speed #1 for 17 hours.

Finally, the remaining reduced calorie fat (152.5 g.) and lecithin is added to this chocolate-flavored mixture and blended thoroughly for about 45 minutes. The temperature is then reduced to 85° to 90° F. (29.4° to 32.2° C.) and, after equilibration, the chocolate-flavored mass is weighed into bar molds in 42.6 g. portions. The molds are placed in a 50° F. (10° C.) environment with circulating air. The bars are then tempered under the following conditions:

| Temperature | | Time (hours) |
| --- | --- | --- |
| (°F.) | (°C.) | |
| 50 | 10 | 72 |
| 60 | 15.6 | 24 |
| 70 | 21.1 | 8 |
| 60* | 15.6* | 16 |

*for demolding purposes

The tempered bars were then demolded, individually wrapped in foil and stored at 70° F. (21.1° C.).

EXAMPLE 2

A chocolate-flavored molding composition is formulated from the following ingredients:

| Ingredient | Amount (g.) |
| --- | --- |
| Reduced calorie fat* | 320.8 |
| Chocolate liquor | 55.1 |
| Lecithin | 0.6 |
| Cocoa powder (10-12% fat) | 61.2 |
| Whole milk solids (26% fat) | 172.8 |
| Vanillin | 0.6 |
| Sucrose | 579.6 |

*Same as Example 1

The cocoa powder, whole milk solids, vanillin and sucrose is blended, and then 216.1 g. of melted reduced calorie fat is added. This mixture is passed through the Lehman Four-Roll refiner (200 psi NIP pressure) twice. The melted chocolate liquor is added to the refined mix (988.1 g.) and then dry conched at 140° F. (60° C.) for 3 hours using a C-100 Hobart mixer set at sped #2. The temperature of the mix is then reduced to 120° to 125° F. (48.9° to 51.7° C.). Lecithin and more reduced calorie fat (50.0 g.) are added, and then the mix is wetconched for 16 hours at speed #1.

An additional 54.7 g. of reduced calorie fat is then added to the wet-conched mixture. The temperature is then reduced to about 9° F. (32.2° C.), and the chocolate-flavored mass is mold into 1 oz. bars. The bars are tempered at 50° F. (10° C.) for 16–18 hours, at 6° F. (15.6° C.) for 24 hours, and then at 70° F. (21.1° C.) for 24 hours before demolding.

EXAMPLE 3

A chocolate-flavored enrobing composition is formulated from the following ingredients:

| Ingredient | Amount (g.) |
| --- | --- |
| Reduced calorie fat* | 570.4 |
| Chocolate liquor | 76.0 |
| Lecithin | 2.0 |
| Cocoa powder (10-12% fat) | 104.0 |
| Whole milk solids (26% fat) | 194.0 |
| Nonfat milk solids | 70.0 |
| Sucrose | 974.0 |

*Same as Example 1.

The cocoa powder, whole milk solids, nonfat milk solids and sucrose are thoroughly blended, and then the melted chocolate liquor is added along with 360.4 g. of the reduced calorie fat. After thorough blending, the result an mixture is passed through a Lehman Four-Roll Refiner twice (NIP pressure 200 psi). The refined mix (1732.6 g.) is recovered and then dry-conched 2½ to 3 hours at 145° F. (62.8° C.) using a Hobart C-100 mixer set at speed #2. After an additional 135.0 g. of the reduced calorie fat is added, the mix temperature is reduced to 125° F. (51.7° C.), and then wet-conched for about 18 hours at speed #1.

The remaining reduced calorie fat (75.0 g.) and the lecithin are then added to the wet-conched mixture and mixed thoroughly. A portion of this chocolate-flavored coating mixture (~1000 g.) is heated to 120° to 125° F. (48.9° to 51.7° C.) and mixed at this temperature for about 60 minutes. The temperature is then reduced to about 85° F. (29.4° C.). Rectangular pieces of confectionary candy centers (caramel, peanuts and nougat) weighing about 8 or 12 g. each are dipped into this chocolate-flavored coating mixture to enrobe the centers. After draining the excess coating, the pieces are placed on trays and cooled to 50° F. (10° C.). After about 65 hours at 50° F. (10° C.), the enrobed candy products are gradually warmed to 60° F. (15.6° C.) and then held at this temperature for 17 days, followed by gradual warming to 70° F. (21.1° C.) and then holding at this temperature for 4 hours. The enrobed 8 g. centers are cut into two pieces, while the 12 g. centers are cut into three pieces, and then wrapped individually in foil for storage at 70° F. (21.1° C.).

What is claimed is:

1. A process for tempering flavored confectionery compositions, which comprises the steps of:
   (I) forming a temperable flavor confectionery composition which comprises:
      a. a flavor-enhancing amount of a flavor-component;
      b. from about 25 to about 45% of a fat component comprising:
         (1) at least about 70% of a reduced calorie fat having:
            (a) at least about 85% combined MLM and MML triglycerides;
            (b) no more than about 5% combined LLM and LML triglycerides;
            (c) no more than about 2% LLL triglycerides;
            (d) no more than about 4% MMM triglycerides;
            (e) no more than about 7% other triglycerides; wherein M is a $C_6$ to $C_{10}$ saturated fatty acid residue and L is a $C_{20}$ to $C_{24}$ saturated fatty acid residue;
            (f) a fatty acid composition having:
               (i) from about 40 to about 60% combined $C_8$ and $C_{10}$ saturated fatty acids,
               (ii) a ratio of $C_8$ to $C_{10}$ saturated fatty acids of from about 1:2.5 to about 2.5:1,
               (iii) from about 40 to about 60% behenic fatty acid,
         (2) up to about 15% milkfat;
         (3) up to about 20% cocoa butter;
         (4) no more than about 4% diglycerides; and
      c. from about 55 to about 75% other nonfat confectionery ingredients;
   (II) rapidly cooling the composition of step (I) to a temperature of about 57° F. (13.9° C.) or less so that the reduced calorie fat forms a sub α phase;
   (III) holding the cooled composition of step (II) at a temperature of about 5° F. (13.9° C.) or less for a period of time sufficient to form an effective amount of β-3 crystals from a portion of the sub α phase of the reduced calorie fat; and
   (IV) after step (III), warming the cooled composition to a temperature in the range of from above about 57° to about 72° F. (about 13.9° to about 22.2° C.) in a manner such that: (a) the remaining portion of the reduced calorie fat transforms into a stable β-3 phase; and (b) the β-3 phase formed does not melt.

2. The process of claim 1 wherein the composition of step (1) comprises from about 0.1 to about 25% of a chocolate flavor component.

3. The process of claim 2 wherein the fat component comprises from about 1 to about 14% cocoa butter.

4. The process of claim 3 wherein the fat component comprises from about 1 to about 14% milkfat.

5. The process of claim 3 wherein the composition of step (I) comprises from about 35 to about 65% sugar.

6. The process of claim 5 wherein the composition of step (1) comprises from about 40 to about 55% sucrose.

7. The process of claim 2 wherein the fat component comprises at least about 80% reduced calorie fat and wherein the reduced calorie fat comprises:
   (a) at least about 90% combined MLM and MML triglycerides;
   (b) no more than about 2% combined LLM and LML triglycerides;
   (c) no more than about 1% LLL triglycerides;
   (d) no more than about 2% MMM triglycerides; and
   (e) no more than about 5% other triglycerides.

8. The process of claim 7 wherein the ratio of CB to $C_{10}$ saturated fatty acids is from about 1:2 to about 2:1.

9. The process of claim 8 wherein the fatty acid composition of the reduced calorie fat comprises no more than about 10% $C_6$ saturated fatty acid, no more than about 10% $C_{20}$ saturated fatty acid, no more than about 2.5% $C_{24}$ saturated fatty acid and no more than about 9% other fatty acids.

10. The process of claim 9 wherein the fat component comprises no more than about 2% diglycerides.

11. The process of claim 3 wherein the composition is rapidly cooled to a temperature in the range of from about 30° to about 55° F. (from about −1.1° to about 12.8.° C.) during step (II) and wherein the cooled composition is held at a temperature in the range of from about 30° to about 55° F. (from about −1.1° to about 12.8° C.) during step (III).

12. The process of claim 11 wherein the cooled composition is held during step (III) in said temperature range for at least about 16 hours.

13. The process of claim 12 wherein the cooled composition is held during step (III) in said temperature range for at least about 40 hours.

14. The process of claim 12 wherein the average cooling rate during step (II) is from about 1° to about 5° F. per minute.

15. The process of claim 14 wherein the average cooling rate during step (II) is from about 2° to about 4° F. per minute.

16. The process of claim 12 wherein the cooled composition is warmed to a temperature in the range of from about 60° to about 70° F. (from about 15.6 ° to about 21.1° C.) during step (IV).

17. The process of claim 16 wherein the warmed composition is held during step (IV) in said temperature range for at least about 1 hour.

18. The process of claim 17 wherein the warmed composition is held during step (IV) in said temperature range for at least about 4 hours.

19. The process of claim 16 wherein the average warming rate during step (IV) is from about 0.5° to about 6° F. per hour.

20. The process of claim 19 wherein the average warming rate during step (IV) is from about 1° to about 10° F. per hour.

21. The process of claim 2 which comprises the further step of including in the composition of step (1) from about 5 to about 10% β-3 crystal seed material prior to step (II).

22. The process of claim 2 which is carried out without including β-3 crystal seed material in the composition of step (I).

23. A process for tempering chocolate-flavored confectionery compositions, which comprises the steps of:

(I) forming a temperable flavored confectionery composition which comprises:
   a. from about 0.1 to about 25% of a chocolate flavor component;
   b. from about 25 to about 45% of a fat component comprising:
      (1) at least about 75% of a reduced calorie fat having:
         (a) at least about 90% combined MLM and MML triglycerides;
         (b) no more than about 2% combined LLM and LML triglycerides;
         (c) no more than about 1% LLL triglycerides;
         (d) no more than about 2% MMM triglycerides;
         (e) no more than about 5% other triglycerides;
      wherein M is a $C_6$ to $C_{10}$ saturated fatty acid residue and L is a $C_{20}$ to $C_{24}$ saturated fatty acid residue;
         (f) a fatty acid composition having:
            (i) from about 45 to about 55% combined $C_8$ and $C_{10}$ saturated fatty acids,
            (ii) a ratio of $C_8$ to $C_{10}$ saturated fatty acids of from about 1:2 to about 2:1,
            (iii) from about 40 to about 50% behenic fatty acid,
            (iv) no more than about 5% $C_6$ saturated fatty acid,
            (v) no more than about 6% $C_{20}$ saturated fatty acid;
            (vi) no more than about 1.5% $C_{24}$ saturated fatty acid, and
            (vii) no more than about 5% other fatty acids;
      (2) up to about 15% milkfat;
      (3) from about 1 to about 14% cocoa butter;
      (4) no more than about 2% diglycerides; and
   c. from about 55 to about 75% other nonfat confectionery ingredients;
(II) rapidly cooling the composition of step (I) to a temperature in the range of from about 30° to about 55° F. (from about −1.1° to about 12.8° C.);
(III) holding the cooled composition of step (II) at a temperature in the range of from about 30° to about 55° F. (from about −1.1° to about 12.8° C.) for at least about 40 hours; and
(IV) after step (III), warming the cooled composition to a temperature in the range of from about 60° to about 70° F. (from about 15.6° to about 21.1° C.) and then holding the warmed composition in said temperature range for at least about 4 hours.

24. The process of claim 23 wherein the fat component comprise from about 5 to about 12% cocoa butter.

25. The process of claim 24 wherein the fat component comprises from about 6 to about 12% milkfat.

26. The process of claim 24 wherein the composition of step (1) comprises from about 40 to about 55% sucrose.

27. The process of claim 26 wherein the composition of step (1) comprises from about 0.05 to about 0.5% lecithin.

28. The process of claim 24 wherein the fat component comprises at least about 85% reduced calorie fat and no more than about 1% diglycerides.

29. The process of claim 28 wherein the ratio of $C_8$ to $C_{10}$ saturated fatty acids is from about 1:1.5 to about 1.5:1 and wherein the reduced calorie fat comprises:
   (a) at least about 94% combined MLM and MML triglycerides;
   (b) no more than about 1% combined LLM and LML triglycerides;

(c) no more than about 0.5% LLL triglycerides;
(d) no more than about 2% MMM triglycerides; and
(e) no more than about 3.5% other triglycerides.

30. The process of claim 24 wherein the cooled composition is held during step (III) in said temperature range for from about 44 to about 72 hours.

31. The process of claim 30 wherein the average cooling rate during step (II) is from about 2° to about 4° F. per minute.

32. The process of claim 31 wherein the warmed composition is held during step (IV) in said temperature range for from about 4 t about 120 hours.

33. The process of claim 32 wherein the average warming rate during step (IV) is from about 0.5° to about 6° F. per hour.

34. The process of claim 33 wherein the average warming rate during step (IV) is from about 1° to about 10° F. per hour.

35. The process of claim 23 which comprises the further step of including in the composition of step (I) from about 5 to about 10% β-3 crystal seed material prior to step (II).

36. The process of claim 23 which is carried out without including β-3 crystal seed material in the composition of step (I).

37. A tempered flavored confectionery product which comprises:
a. a flavor-enhancing amount of a flavor component;
b. from about 25 to about 45% of a fat component comprising:
  (1) at least about 70% of a reduced calorie fat having:
    (a) at least about 85% combined MLM and MML triglycerides;
    (b) no more than about 5% combined LLM and LML triglycerides;
    (c) no more than about 2% LLL triglycerides;
    (d) no more than about 4% MMM triglycerides;
    (e) no more than about 7% other triglycerides;
  wherein M is a $C_6$ to $C_{10}$ saturated fatty acid residue and L is a $C_{20}$ to $C_{24}$ saturated fatty acid residue;
  (f) a fatty acid composition having:
    (i) from about 40 to about 60% combined $C_8$ and $C_{10}$ saturated fatty acids,
    (ii) a ratio of $C_8$ to $C_{10}$ saturated fatty acids of from about 1:2.5 to about 2.5:1,
    (iii) from about 40 to about 60% behenic fatty acid,
  (2) up to about 15% milkfat;
  (3) up to about 20% cocoa butter;
  (4) no more than about 4% diglycerides; and
c. from about 55 to about 75% other nonfat confectionery ingredients.

38. The product of claim 37 which comprises from about 0.1 to about 25% of a chocolate flavor component.

39. The product of claim 38 wherein the fat component comprises from about 5 to about 12% cocoa butter.

40. The product of claim 39 wherein the fat component comprises from about 6 to about 12% milkfat.

41. The product of claim 38 which comprises from about 35 to about 65% sugar.

42. The product of claim 38 which comprises from about 40 to about 55% sucrose.

43. The product of claim 38 wherein the fat component comprises at least about 80% reduced calorie fat and wherein the reduced calorie fat comprises:
(a) at least about 90% combined MLM and MML triglycerides;
(b) no more than about 2% combined LLM and LML triglycerides;
(c) no more than about 1% LLL triglycerides;
(d) no more than about 2% MMM triglycerides; and
(e) no more than about 5% other triglycerides.

44. The product of claim 43 wherein the ratio of CB to $C_{10}$ saturated fatty acids is from about 1:2 to about 2:1.

45. The product of claim 44 wherein the fatty acid composition of the reduced calorie fat comprises no more than about 10% $C_6$ saturated fatty acid, no more than about 10% $C_{20}$ saturated fatty acid, no more than about 2.5% $C_{24}$ saturated fatty acid and no more than about 9% other fatty acids.

46. The product of claim 45 wherein the fatty acid composition of the reduced calorie fat comprises:
(i) from about 45 to about 55% combined $C_8$ and $C_{10}$ saturated fatty acids, p1 (ii) a ratio of $C_8$ to $C_{10}$ saturated fatty acids of from about 1:2 to about 2:1,
(iii) from about 40 to about 50% behenic fatty acid,
(iv) no ore than about 5% $C_6$ saturated fatty acid,
(v) no more than about 6% $C_{20}$ saturated fatty acid;
(vi) no more than about 1.5% $C_{24}$ saturated fatty acid, and
(vii) no more than about 5% other fatty acids.

47. The product of claim 46 wherein the ratio of $C_8$ to $C_{10}$ saturated fatty acids is from about 1:1.5 to about 1.5:1 and wherein the reduced calorie fat comprises:
(a) at least about 94% combined MLM and MML triglycerides;
(b) no more than about 1% combined LLM and LML triglycerides;
(c) no more than about 0.5% LLL triglycerides;
(d) no more than about 2% MMM triglycerides; and
(e) no more than about 3.5% other triglycerides.

48. The product of claim 45 wherein the fat component comprises no more than about 2% diglycerides.

49. The product of claim 48 wherein the fat component comprises no more than about 1% diglycerides.

* * * * *